United States Patent
Chitgupakar et al.

(10) Patent No.: US 7,516,152 B2
(45) Date of Patent: Apr. 7, 2009

(54) SYSTEM AND METHOD FOR GENERATING AND SELECTING DATA MINING MODELS FOR DATA MINING APPLICATIONS

(75) Inventors: Milind Chitgupakar, Omaha, NE (US); Mark S. Ramsey, Colleyville, TX (US); David A. Selby, Nr Fareham (GB)

(73) Assignee: International Business Machines Corporation, Armonk, NY (US)

( * ) Notice: Subject to any disclaimer, the term of this patent is extended or adjusted under 35 U.S.C. 154(b) by 337 days.

(21) Appl. No.: 11/174,697

(22) Filed: Jul. 5, 2005

(65) Prior Publication Data

US 2007/0011187 A1    Jan. 11, 2007

(51) Int. Cl.
*G06F 7/00* (2006.01)
(52) U.S. Cl. .............................. 707/102; 707/2; 707/6; 707/7; 707/8; 707/101; 706/12; 706/43
(58) Field of Classification Search ................ 707/1, 707/2, 3, 4, 5, 6, 7, 8, 9, 101, 102, 103, 104
See application file for complete search history.

(56) References Cited

U.S. PATENT DOCUMENTS

| | | | | |
|---|---|---|---|---|
| 4,831,582 | A | * | 5/1989 | Miller et al. ............ 707/104.1 |
| 6,035,341 | A | * | 3/2000 | Nunally et al. ............ 709/253 |
| 6,189,005 | B1 | | 2/2001 | Chakrabarti et al. ........... 707/6 |
| 6,278,997 | B1 | | 8/2001 | Agrawal et al. ............... 707/6 |
| 6,430,547 | B1 | | 8/2002 | Busche et al. ................. 707/1 |
| 6,539,378 | B2 | | 3/2003 | Gupta et al. ................... 707/5 |
| 6,553,366 | B1 | | 4/2003 | Miller et al. ................... 707/2 |
| 6,611,829 | B1 | | 8/2003 | Tate et al. ...................... 707/2 |
| 6,629,095 | B1 | | 9/2003 | Wagstaff et al. ............... 707/5 |
| 6,651,048 | B1 | | 11/2003 | Agrawal et al. ................ 707/2 |
| 6,675,164 | B2 | | 1/2004 | Kamath et al. ................. 707/6 |
| 6,687,693 | B2 | | 2/2004 | Cereghini et al. .............. 707/6 |
| 6,687,695 | B1 | | 2/2004 | Miller et al. ................... 707/6 |

(Continued)

OTHER PUBLICATIONS

Sou-sen Leu et al, "Data Mining for Tunnel Support Stability: Neural Network Approach," Automation in Construction, vol. 10, Issue 4, May 2001, pp. 429-441.

(Continued)

*Primary Examiner*—Etienne P LeRoux
*Assistant Examiner*—Mohammad S Rostami
(74) *Attorney, Agent, or Firm*—Schmeiser, Olsen & Watts; Anna Linne (57) ABSTRACT

A computing system and method for generating and selecting data mining models. The computing system comprises a computer readable medium and computing devices electrically coupled through an interface apparatus. A data mining modeling algorithm is stored on the computer readable medium. Each of the computing devices comprises at least one central processing unit (CPU) and an associated memory device. Each of the associated memory devices comprises a data subset from a plurality of data subsets. A technique is selected for generating a data mining model applied to each of the data subsets. The data mining modeling algorithm is run simultaneously, on each of the computing devices, using the selected technique to generate an associated data mining model on each of the computing devices. A best data mining model from the generated data mining models is determined in accordance with the selected technique.

27 Claims, 4 Drawing Sheets

U.S. PATENT DOCUMENTS

| | | | |
|---|---|---|---|
| 6,687,696 | B2 | 2/2004 | Hofmann et al. ............... 707/6 |
| 6,718,322 | B1 | 4/2004 | Brye ............................. 707/3 |
| 6,718,338 | B2 | 4/2004 | Vishnubhotla ............. 707/102 |
| 6,772,166 | B1 | 8/2004 | Hildreth .................... 707/102 |
| 6,775,831 | B1* | 8/2004 | Carrasco et al. ............. 718/100 |
| 7,039,654 | B1* | 5/2006 | Eder ....................... 707/104.1 |
| 2002/0077790 | A1 | 6/2002 | Bisgaard-Bohr et al. ....... 707/2 |
| 2002/0138492 | A1* | 9/2002 | Kil ............................. 707/100 |
| 2003/0088565 | A1* | 5/2003 | Walter et al. ................... 707/6 |
| 2003/0217033 | A1* | 11/2003 | Sandler et al. ................ 707/1 |
| 2004/0128287 | A1 | 7/2004 | Keller et al. .................... 707/3 |
| 2004/0177081 | A1* | 9/2004 | Dresden .................... 707/100 |
| 2004/0267729 | A1* | 12/2004 | Swaminathan et al. ......... 707/3 |
| 2005/0050087 | A1* | 3/2005 | Milenova et al. ............ 707/102 |
| 2006/0064415 | A1* | 3/2006 | Guyon et al. .................. 707/6 |
| 2006/0085422 | A1* | 4/2006 | Moyaux et al. ............... 707/10 |
| 2006/0136462 | A1* | 6/2006 | Campos et al. ............. 707/102 |
| 2007/0011135 | A1* | 1/2007 | Chitgupakar et al. ........... 707/1 |
| 2007/0011188 | A1* | 1/2007 | Chitgupakar et al. ........ 707/102 |

OTHER PUBLICATIONS

Kumar et al; High Performance Data Mining Tutorial PM-3; pp. 309-425.

Steingold et al.; Measuring Real-Time Predictive Models; 0-7695-1119-8/01 2001 IEEE; pp. 649-650.

Kamran Sartipi; Software Architecture Recovery based on Pattern Matching; 1063-6773/03 2003 IEEE; 4 pages.

Mark Last; A Compact and Accurate Model for Classification; 1041-4347/04 2004 IEEE; IEEE Transactions on Knowledge and Data Engineering, vol. 16, No. 2, Feb. 2004; pp. 203-215.

Madria et al.; Association Rules for Web Data Mining in WHOWEDA; 0-7695-1022-1/01 2001 IEEE; pp. 227-233.

Jin et al.; A Super-Programming Approach for Mining Association Rules in Parallel on PC Clusters; IEEE Transactions on Parallel and Distributed Systems, vol. 15, No. 9, Sep. 2004; pp. 783-793.

Allinson et al.; Interactive and Semantic Data Visualisation using Self-Organising Maps; pp 1-9.

Pan et al.; Hybrid Neural Network and C4.5 For Misuse Detection; 0-7803-7865-2/03 2003 IEEE; 2003 International Conf. Machine Leraning andCybernetics; vol. 4 of 5; pp. 2463-2467.

Vafaie et al.; Improving Performance of Inductive Models Through an Algorithm and Sample Combination Strategy; International Journal of Artificial Intelligence Tools; Dec. 2001, vol. 10, No. 4; pp. 555-572.

Lee et al.; Neural-Based Approaches for Improving the Accuracy of Decision Trees; Y. Kambayashi, W. Winiwarter, M. Arikawa (Eds.): DaWaK 2002, LNCS 2454; pp. 114-123, 2002.

Sousa et al.; Modeling Charity Donations Using Target Selection for Revenue Maximization; 0-7803-7810-5/03 2003 IEEE; The 12th IEEE International Conf. on Fuzzy Systems; vol. 1; pp. 654-659.

Hall et al.; Why are Neural Networks Sometimes Much More Accurate than Decision Trees; An Analysis on a Informatics Problem 0-7803-7952-7/03 2003 IEEE; SMC'03 Conference Proceedings, vol. 3 of 5; pp. 2851-2856.

Szupiluk et al.; Independent Component Analysis as Postprocessing Stage in Data Mining: AI-METH 2003—Artificial Intelligence Methods; Nov. 5-7, 2003, Gliwice, Poland; pp. 311-314.

Feng et al.; Data mining techniques applied to predictive modeling of the knurling process; IIE Transactions (2004) 36, 263; 0740-817X print / 1545-8830 online; DOI: 10.1080/07408170490274214.

Hossain et al.; A study of re-sampling methods with regression modeling; Third International Conference on Data Mining, Data Mining III; pp. 83-91, 2002.

Ros et al.; Development of predictive models by adaptive fuzzy partitioning. Application to compounds active on the central nervous system; Chemometrics and Intelligent Laboratory Systems 67 (2003); pp. 29-50.

* cited by examiner

SYSTEM AND METHOD FOR GENERATING AND SELECTING DATA MINING MODELS FOR DATA MINING APPLICATIONS

BACKGROUND OF THE INVENTION

1. Technical Field

The present invention relates to a system and associated method for selecting a data mining model.

2. Related Art

Locating specific data from a large amount of data is typically very time consuming. Therefore there exists a need for a time efficient procedure to locate specific data from a large amount of data.

SUMMARY OF THE INVENTION

The present invention provides a data mining method, comprising:

providing a computing system comprising a computer readable medium and computing devices electrically coupled through an interface apparatus, wherein a data mining modeling algorithm is stored on said computer readable medium, wherein each of said computing devices comprising at least one central processing unit (CPU) and an associated memory device, wherein data has been divided by the computing system into a plurality of data subsets, wherein each of said associated memory devices comprises a data subset from said plurality of randomly placed data subsets;

selecting a technique for generating a data mining model applied to each of said randomly placed data subsets;

running simultaneously, on each of said computing devices, said data mining modeling algorithm using said selected technique to generate an associated data mining model on each of said computing devices; and determining, a best data mining model from said generated data mining models in accordance with said selected technique.

The present invention provides a computing system comprising a processor coupled to a computer readable medium and computing devices electrically coupled through an interface apparatus, wherein said computer readable medium comprises a data mining modeling algorithm and instructions that when executed by the processor implement a data mining method, wherein each of said computing devices comprising at least one central processing unit (CPU) and an associated memory device, wherein data has been divided by the computing system into a plurality of data subsets, wherein each of said associated memory devices comprises a data subset from said plurality of randomly placed data subsets, said method comprising the computer implemented steps of:

selecting a technique for generating a data mining model applied to each of said randomly placed data subsets;

running simultaneously, on each of said computing devices, said data mining modeling algorithm using said selected technique to generate an associated data mining model on each of said computing devices; and determining, a best data mining model from said generated data mining models in accordance with said selected technique.

The present invention provides a process for integrating computing infrastructure, comprising integrating computer-readable code into a computing system, wherein the code in combination with the computing system comprises a computer readable medium and computing devices electrically coupled through an interface apparatus, wherein a data mining modeling algorithm is stored on said computer readable medium, wherein each of said computing devices comprising at least one central processing unit (CPU) and an associated memory device, wherein data has been divided by the computing system into a plurality of data subsets, wherein each of said associated memory devices comprises a data subset from said plurality of randomly placed data subsets, and wherein the code in combination with the computing system is adapted to implement a method for performing the steps of:

selecting a technique for generating a data mining model applied to each of said randomly placed data subsets;

running simultaneously, on each of said computing devices, said data mining modeling algorithm using said selected technique to generate an associated data mining model on each of said computing devices; and determining, a best data mining model from said generated data mining models in accordance with said selected technique.

The present invention provides a computer program product, comprising a computer usable medium having a computer readable program code embodied therein, said computer readable program code comprising an algorithm adapted to implement a data mining method within a computing system, said computing system comprising a computer readable medium and computing devices electrically coupled through an interface apparatus, wherein a data mining modeling algorithm is stored on said computer readable medium, wherein each of said computing devices comprising at least one central processing unit (CPU) and an associated memory device, wherein data has been divided by the computing system into a plurality of data subsets, wherein each of said associated memory devices comprises a data subset from said plurality of randomly placed data subsets, said method comprising the steps of:

selecting a technique for generating a data mining model applied to each of said randomly placed data subsets;

running simultaneously, on each of said computing devices, said data mining modeling algorithm using said selected technique to generate an associated data mining model on each of said computing devices; and determining, a best data mining model from said generated data mining models in accordance with said selected technique.

DETAILED DESCRIPTION OF THE INVENTION

Figure 1:
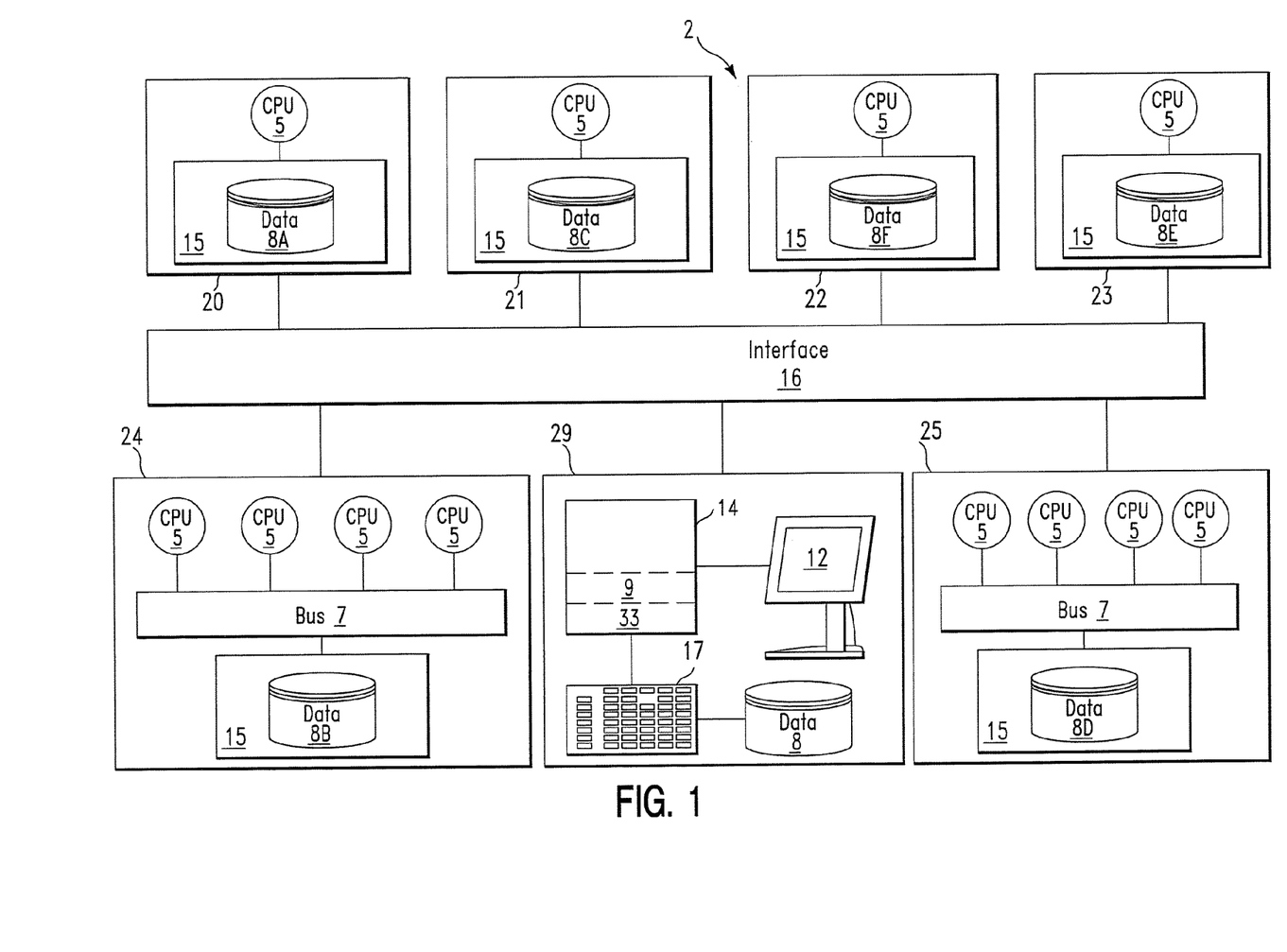
FIG. 1 illustrates a block diagram view of a database system for generating data mining models and determining a best data mining model from the data mining models, in accordance with embodiments of the present invention.

FIG. 1 illustrates a block diagram view of a database system 2 for generating data mining models and determining a best data mining model from the data mining models, in accordance with embodiments of the present invention. The database system 2 may alternatively be a computing system. A data mining model is generated using existing customer data (e.g., customer behavioral data) such as, inter alia, purchasing history, returned-items history, payment history, promotional offers history, demographic data regarding the customer, etc. A data mining model may be used by an entity (e.g., a company offering products or services such as, inter alia, credit cards, consumer products, mortgages, etc.) to predict future customer behavior (i.e., propensity to respond to a product or service offer) based on an analysis of numerous customer attributes (e.g., purchasing history, returned-items history, payment history, promotional offers history, demographic data regarding, etc.) from the past. The accuracy of the prediction is tied to the ability of a data mining professional to generate and test numerous data mining models, potentially using various algorithms, to determine a "best" data mining model having a highest degree of correlation to a desired product offer or service offer with respect to a customer(s). A database system (e.g., database system 2 in FIG. 1) comprises existing customer data (e.g., data 8 in FIG. 1) divided or allocated into individual data subsets (e.g., data subsets 8A . . . 8F in FIG. 1) within individual computing devices or nodes (e.g., computing devices 20 . . . 25 in FIG. 1). The individual data subsets comprise an allocated portion of the total customer data. Each data subset is defined as 1/N multiplied by the total data set, wherein N is the total number of nodes or individual computing devices. For example, a 100 node (i.e., 100 computing device) parallel system would allocate $1/100^{th}$ of the total data set (e.g., data 8) on each node. The total data may be allocated among the nodes uniformly (as in the previous example), randomly (e.g., using a hash algorithm), or the data may be allocated among the nodes according to a business rule, such as, inter alia, a customer number. Once the total data is allocated and stored across the nodes of the database system, the data subsets are available for access to generate data mining models. The data subsets may be allocated among the nodes in the database system as the data is entered into the database system. A technique is selected for generating data mining models applied to each of the data subsets and determining a "best" data mining model. The technique may comprise any technique including, inter alia, a lift chart technique as defined, infra, a root mean squared technique as defined, infra, etc. A data mining modeling algorithm is applied by a coordinator node (e.g., administrator computing apparatus 29) to the data subsets simultaneously to generate in accordance with the selected technique to generate and compare numerous data mining models. The data mining modeling algorithm may comprise any type of data mining modeling algorithm including, inter alia, a decision tree algorithm, a clustering algorithm, a radial basis function algorithm, a linear regression algorithm, an associations algorithm, and a neural network algorithm, etc. Each of the above mentioned data mining modeling algorithms are defined, infra. An output from the generated data mining models comprises a numerical description of an "expected behavior(s)" for a customer(s). By comparing results of these "expected behaviors" at a coordinator node (e.g., administrator computing apparatus 29) in accordance with the selected technique in the database system, a "best" data mining model may be selected. The "best" data mining model comprises a highest degree of correlation to a desired product or service offer with respect to a customer(s). The database system 2 comprises computing devices 20, 21, 22, 23, 24, and 25, electrically connected to an interface 16. The interface 16 may comprise any type of interface known to a person of ordinary skill in the art including, inter alia, a local area network (LAN), etc. Additionally, the database system 2 comprises an administrator computing apparatus 29 electrically connected to the interface 16. Each of computing devices 20, 21, 22, and 23 comprises a single central processing unit (CPU) 5 and a memory unit 15. Each of computing devices 24 and 25 comprises a plurality of CPUs 5 connected to a memory unit 15 through a bus 7. The computing devices 24 and 25 are symmetric multiprocessing (SMP) computing devices. An SMP computing device is a computing device comprising multiple CPUs to complete individual processes simultaneously. The database system 2 may comprise an unlimited number of computing devices similar to: the computing devices 20 . . . 23, the computing devices 24 . . . 25, or a combination of computing devices similar to the computing devices 20 . . . 23 and the computing devices 24 . . . 25. The database system 2 may comprise only computing devices similar to the computing devices 20 . . . 23 (i.e., comprising a single CPU). As a first alternative, the database system 2 may comprise only computing devices similar to the computing devices 24 . . . 25 (i.e., SMP computing devices). As a second alternative, the database system 2 may comprise a combination of computing devices (unlimited number) similar to the computing devices 20 . . . 23 and the computing devices 24 . . . 25 as illustrated in FIG. 1. The database system 2 illustrated in FIG. 1 comprises a massively parallel processing (MPP) computer system comprising single CPU 5 computing devices (i.e., computing device 20 . . . 23) and SMP computing devices (i.e., computing device 25 . . . 25). An MPP computer system is a computer system that comprises separate CPUs running in parallel (i.e., simultaneously) to execute a single program. The administrator computing apparatus 29 comprises a computer 14, an input device 17, an output device 12, a database managing software application 9, and a data mining modeling algorithm(s) 33. The database managing software application may comprise any type of database manager software including inter alia, DB2 database management system by IBM, etc. The computer 14 may comprise any type of computer known to a person of ordinary skill in the art including, inter alia, a personal computer, a server computer, etc. The input device 17 may comprise any type of input device known to a person of ordinary skill in the art including, inter alia, a keyboard, a computer disc drive, a keypad, a network connection, etc. The output device 12 may comprise any type of output device known to a person of ordinary skill in the art including, inter alia, a monitor, a printer, etc. The administrator computing apparatus 29 may access and send instructions, programs and/or copies of the database managing software application 9 to each of the memory devices 15 within each of the computing devices 20 . . . 23 and 24 . . . 25. Each of the computing devices 20 . . . 23 and 24 . . . 25 may only access their own memory device 15 and may not access each other's memory devices 15. A stream of data 8 is inputted into the administrator computing apparatus 29 through the input device 17. The administrator computing apparatus 29 divides the stream of data 8 into a plurality of data subsets 8A . . . 8F. The stream of data 8 may comprise a steady stream of data. Alternatively, the stream of data 8 may comprise a stream of data inputted through the input device 17 in intervals. The administrator computing apparatus 29, randomly or by use of a business rule, sends each of the data subsets 8A . . . 8F to a different one of computing devices 20, 21, 22, 23, 24, or 25. A technique is selected for generating data mining models applied to each of the data subsets and determining a "best" data mining model. The technique may comprise any technique including, inter alia, a lift chart technique as defined, infra, a root mean squared technique as defined, infra, etc. A selected data mining modeling algorithm 33 is applied by the administrator computing apparatus 29 to each of data subsets 8A . . . 8F within each of computing devices 20 . . . 23 and 24 . . . 25 to simultaneously generate and compare numerous data mining models in accordance with the selected technique. The data mining modeling algorithm 33 may comprise any type of data mining modeling algorithm including, inter alia, a decision tree algorithm, a clustering algorithm, a radial basis function algorithm, a linear regression algorithm, an association's algorithm, and a neural network algorithm. A decision tree algorithm comprises a method for dividing the data subsets into a tree with an objective of predicting an outcome by using a "divide and conquer" approach. A clustering algorithm comprises placing data subsets into groups otherwise known as clusters whereby all the customers are "similar". A radial basis function algorithm comprises a method referred to as supervised learning (alternative examples in same a class as supervised learning may be time-series analysis, multivariate analysis, etc.). A linear regression algorithm comprises a method of fitting a line to a set of observations such as to minimize the scatter of the original pattern. An association's algorithm comprises a method used for discovering regularities in a data subset and generally predicts different things. A neural network algorithm comprises a computing method based parallel architecture. Neural networks comprise simple processing elements, a high degree of interconnection, simple scalar messages, and adaptive interaction between elements. The administrator computing apparatus 29 using a selected technique compares each of the generated data mining models to each other and a "best" data mining model is determined. The "best" data mining model comprises a highest degree of correlation to a desired product offer or service offer with respect to a customer(s). The "best" data mining model may be determined using a plurality of techniques including, inter alia, a lift chart technique, a root mean squared technique, etc. A lift chart technique comprises calculating a measure of the effectiveness of a predictive model (i.e., data mining model) as a ratio between results obtained with and without the predictive model. For example, a lift chart technique comprises using a measurement comprising a determination of how much better (or worse) a data mining model predicted results for a given case set would be in comparison to random selection. A lift is typically calculated by dividing a percentage of expected response predicted by the data mining model by the percentage of expected response predicted by a random selection. For example, if a normal density of response to a direct mail campaign for a product offer or service offer is 10 percent, a determination may be made by focusing on a top quartile of the case set predicted to respond to the campaign by the data mining model. The determination comprises a density of response increasing to 30 percent. Therefore the lift would be calculated at 3, or 30/10. A root mean squared technique comprises a special form of error rate for a prediction involving continuous, ordered attributes. The mean-squared error is the measurement of variation between a predicted value and an actual value. Subtracting the two values and squaring the result provides the rate of squared error. The rate of squared error is averaged over all predictions for the same attribute to provide an estimate of variation for a given prediction. The result is squared to ensure that all errors are positive and can be added together when the average is taken. Additionally, the result is squared to weigh widely varying prediction values. For example, if a prediction for unit sales (in thousands) for one store is 50 and the actual unit sales (in thousands) for the store was 65, the mean squared error would be 65−50=15, raised to the power of 2, or 225.

Figure 2:
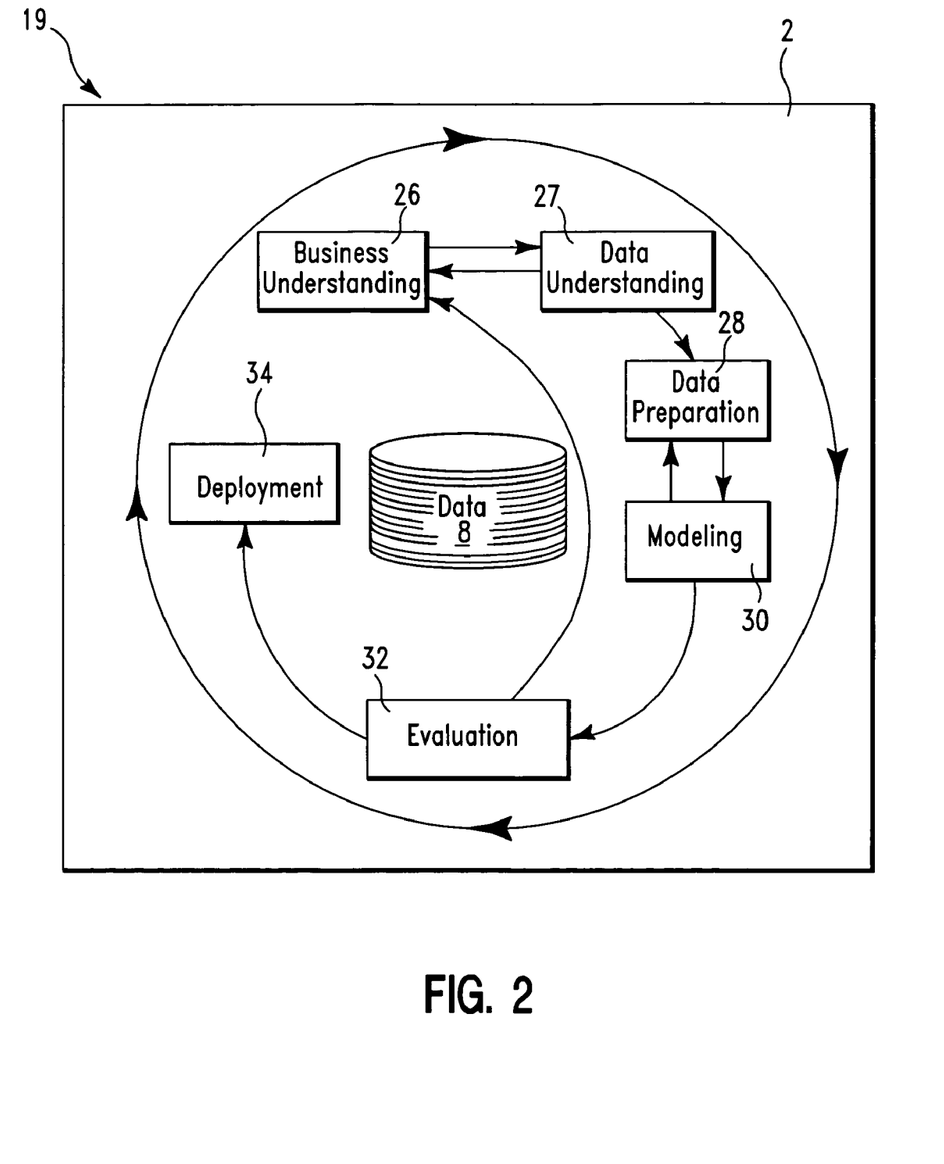
FIG. 2 illustrates a block diagram comprising an algorithm for implementing the database system of FIG. 1 for producing a propensity to lapse data mining model, in accordance with embodiments of the present invention.

FIG. 2 illustrates a block diagram comprising an algorithm 19 for implementing the database system 2 of FIG. 1 for producing a propensity to lapse data mining model, in accordance with embodiments of the present invention. Step 26 comprises a process for building a business understanding with the underlying business issues associated with lapsing one's policy/product in the customer's domain. Step 27 comprises using the information from step 25 to source a set of variables from the existing database/client spreadsheets (i.e., data 8). This is typically undertaken as an iterative process. A key to building a predictive model is finding evidence of attrition within the historical population (i.e., customer database). Step 28 comprises a data preparation phase requiring performing exploratory data analysis on the set of chosen variables and undertaking some necessary mathematical transformations. For example, a number of weeks a policy is in force may be determined by subtracting the current date from the date the policy was in force to calculate the number of weeks. In Step 30, data mining models are generated and evaluated so that the population (i.e., customer data) may be divided into several samples for training purposes. There are two reasons for dividing the population (i.e., customer data) into several samples. A first reason for dividing the population (i.e., customer data) into several samples is to reduce a run time, by reduction in data mining model complexity. A second reason for dividing the population (i.e., customer data) into several samples is to try to unbiased the data samples. Typically a number of attritions for the population are few and therefore the attritions are overloaded by statistics of the portion of the population that may not accept a product or service offer. By choosing smaller populations to compare against each other, more representative data mining models may be generated. Typically, an entity may want to select as many training cases (i.e., samples) as possible when creating a data mining model, but time limitations typically reduce an actual number of training cases selected, thereby ensuring that the training case set (i.e., samples) closely represents the density and distribution of the production case set. A largest possible training case set may be selected to smooth a distribution of training case attributes. The process of creating such a representative set of data, called sampling, is best handled by selecting records completely at random. Such random sampling should provide a truly unbiased view of the data. As a result of step 30, a plurality of data mining models are generated. In step 32, data mining models that have been generated are stored and used for later comparison to each other to select a most effective data mining model (i.e., a "best" data mining model). A "best" data mining model may be selected using a plurality of techniques including, inter alia, a lift chart technique, a root mean squared technique, etc. as described in the description of FIG. 1. In step 34, a "best" data mining model is selected and deployed with respect to a product offer or service offer.

Figure 3:
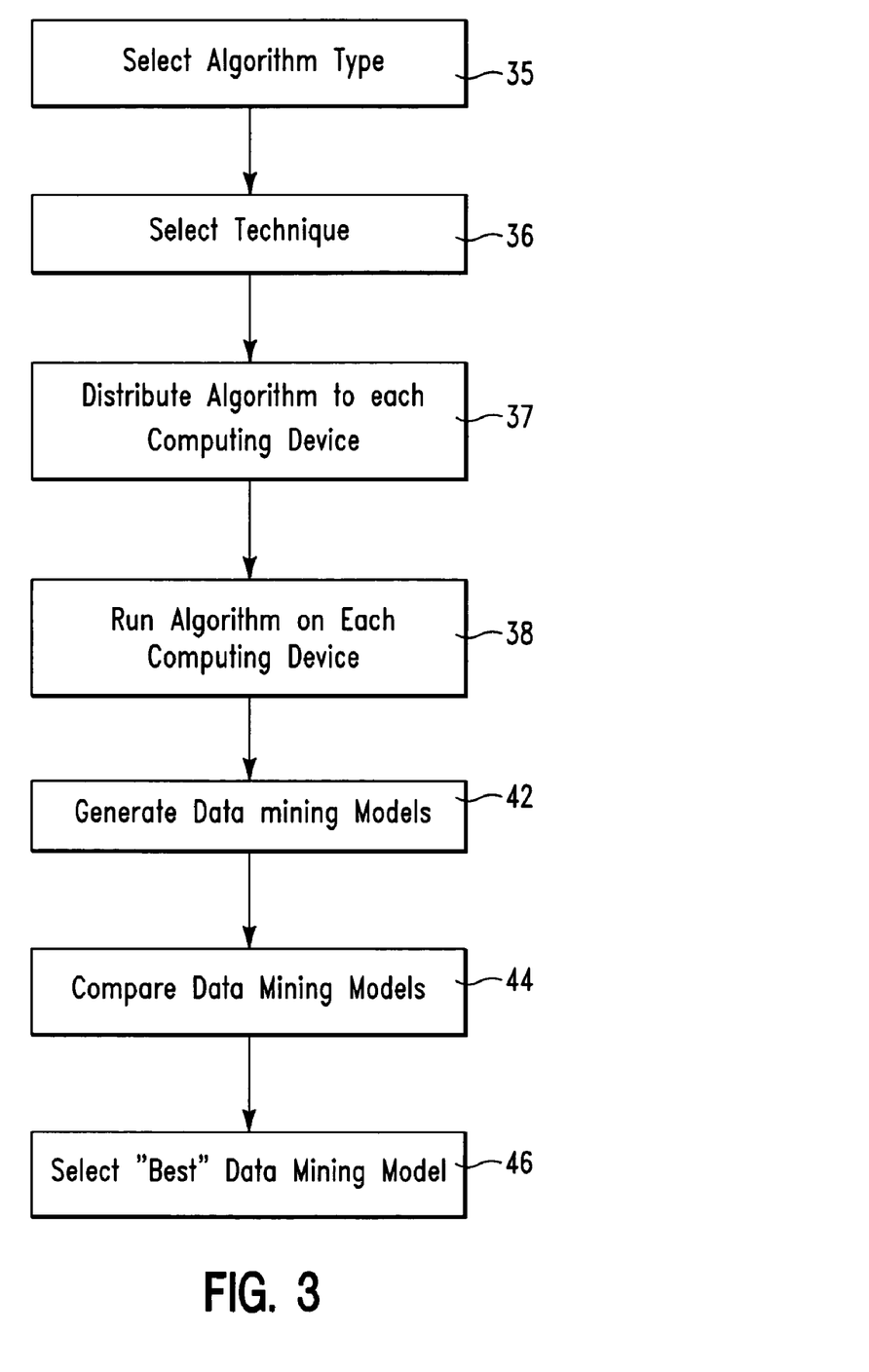
FIG. 3 illustrates a flowchart comprising an algorithm used by database system of FIG. 1 for generating data mining models and selecting a best data mining model, in accordance with embodiments of the present invention.

FIG. 3 illustrates a flowchart comprising an algorithm used by database system 2 of FIG. 1 for generating data mining models and selecting a "best" data mining model, in accordance with embodiments of the present invention. In step 35, a data mining modeling algorithm 33 is selected base on a specified criteria and stored on the administrator computing apparatus 29. The data mining modeling algorithm 33 may comprise any type of data mining modeling algorithm including, inter alia, a decision tree algorithm, a clustering algorithm, a radial basis function algorithm, a linear regression algorithm, an associations algorithm, a neural network algorithm, etc. as described and defined in the description of FIG. 1. In step 36, a technique is selected for generating data mining models applied to each of the data subsets 8A . . . 8F and determining a "best" data mining model. The selected techniques may include, inter alia, a lift chart technique, a root mean squared technique, etc. as described and defined in the description of FIG. 1. In step 37, the administrator computing apparatus 29 transmits simultaneously, the data mining modeling algorithm 33 to each of data subsets 8A . . . 8F within each of computing devices 20 . . . 23 and 24 . . . 25. In step 39 the data mining modeling algorithm 33 is run simultaneously, using the selected technique from step 36, on each of data subsets 8A . . . 8F within each of computing devices 20 . . . 23 and 24 . . . 25. In step 42, a plurality of data mining models are simultaneously generated. In step 44, the administrator computing apparatus 29 compares each of the generated data mining models to each other using the selected technique. In step 46, a "best" data mining model is selected. The "best" data mining model comprises a highest degree of correlation to a desired product offer or service offer with respect to a customer(s).

Figure 4:
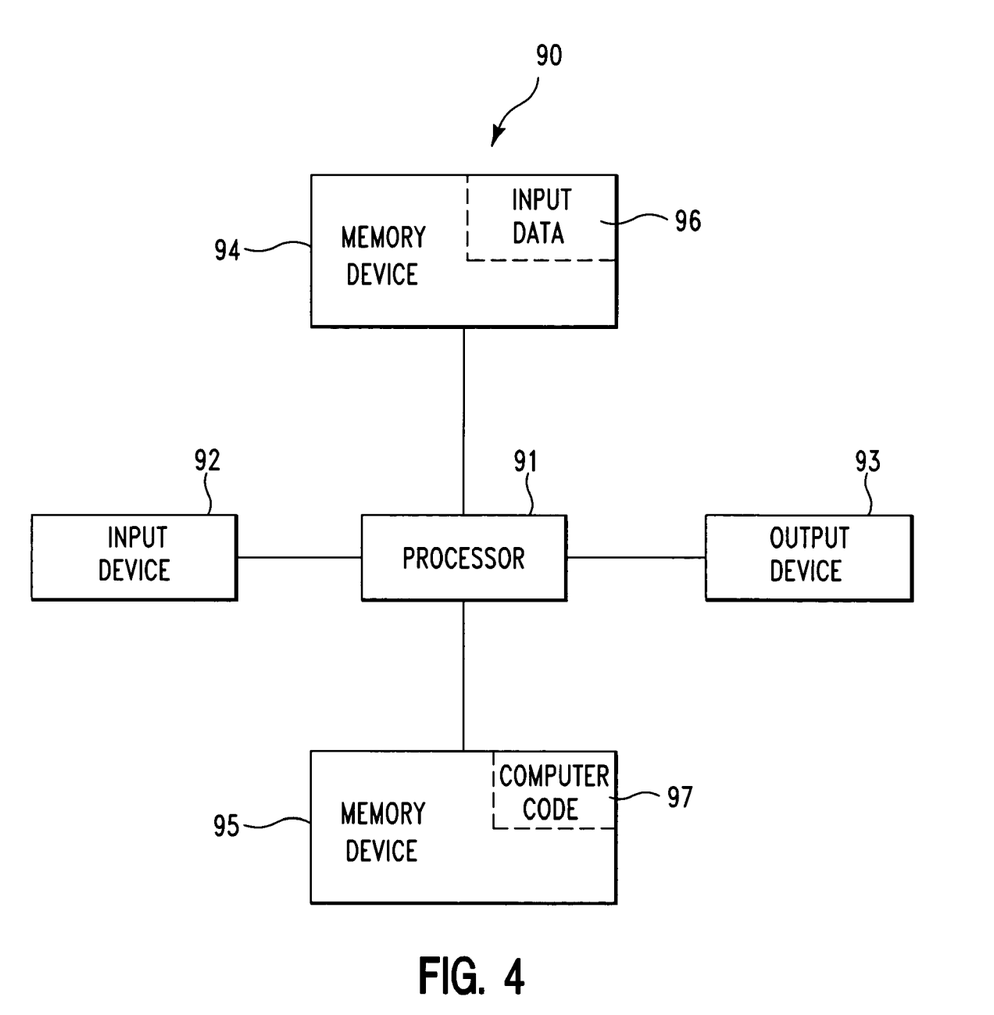
FIG. 4 illustrates a computer system used for implementing the database system of FIG. 1 for generating and selecting data mining models, in accordance with embodiments of the present invention.

FIG. 4 illustrates a computer system 90 used for implementing the database system 2 of FIG. 1 for generating and selecting data mining models, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes an algorithm for generating and selecting data mining models. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 4) may comprise the database system 2 of FIG. 1 and may be used as a computer usable medium (or a computer readable medium or a program storage device) having a computer readable program code embodied therein and/or having other data stored therein, wherein the computer readable program code comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method used for generating and selecting data mining models.

While FIG. 4 shows the computer system 90 as a particular configuration of hardware and software, any configuration of hardware and software, as would be known to a person of ordinary skill in the art, may be utilized for the purposes stated supra in conjunction with the particular computer system 90 of FIG. 4. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A data mining method, comprising:
providing a computing system comprising a computer readable medium and a plurality of computing devices electrically coupled through an interface apparatus, wherein a data mining modeling algorithm is stored on said computer readable medium, and wherein each of said plurality of computing devices comprises at least one central processing unit (CPU) and an associated memory device;
receiving, by each computing device of said plurality of computing devices, a copy of a database managing software application;
receiving, by said computing system, a steady stream of data;
dividing, by the computing system, said data into a plurality of data subsets;
associating, by the computing system, each data subset of said plurality of data subsets with a different customer number associated with a different customer;
placing, by the computing system, a different data subset of said data subsets in each said associated memory device, wherein said receiving, said dividing, and said placing are performed simultaneously;
selecting a lift chart technique for generating data mining models, wherein said data mining models comprise associated data mining models applied to each of said randomly placed data subsets;
receiving simultaneously, by each of said plurality of computing devices, said data mining modeling algorithm;
running simultaneously, on each of said plurality of computing devices, said data mining modeling algorithm on a different associated data subset of said plurality of data subsets using said selected lift chart technique to generate an associated data mining model on each of said plurality of computing devices;
calculating, by said computing system, a lift for each of said data mining models, wherein said calculating comprises calculating a first lift for first data mining model of said data mining models by dividing a percentage of expected responses predicted by said first data mining model by a percentage of expected responses predicted by a random selection, wherein a normal density of responses to a direct mail campaign for a service offer is equal to 10 percent, wherein a determination generated by focusing on a top quartile of a case set predicted to respond to said direct mail campaign by said first data mining model, wherein said determination comprises a density of responses increasing to 30 percent, and wherein said first lift is equal to 30/10;
simultaneously comparing, by a coordinator node of said computing system, each said lift to each other;
determining based on results of said comparing, by said computing system, a best data mining model from said data mining models, wherein said best data mining model is said first data mining model;
removing each said different data subset from each said associated memory device; and
deploying, by said computing system, said best data mining model with respect to said direct mail campaign.

2. The data mining method of claim 1, wherein said selected technique comprises and a root mean squared technique, and wherein said method further comprises:

determining by said root mean squared technique, a rate of error for each of said generated data mining models.

3. The data mining method of claim 1, wherein said data mining modeling algorithm is selected from the group consisting of a decision tree algorithm, a clustering algorithm, a radial basis function algorithm, a linear regression algorithm, an associations algorithm, and a neural network algorithm.

4. The data mining method of claim 1, wherein said interface apparatus is a high speed switching apparatus.

5. The data mining method of claim 1, wherein said computing system comprises a system selected from the group consisting of a massively parallel processing system, a symmetric multiprocessing system, and a combination of a massively parallel processing system and a symmetric multiprocessing system.

6. The data mining method of claim 1, wherein said computing system further comprises a relational database software system.

7. A computing system comprising a processor coupled to a computer readable medium and a plurality of computing devices electrically coupled through an interface apparatus, wherein said computer readable medium comprises a data mining modeling algorithm and instructions that when executed by the processor implement a data mining method, and wherein each of said plurality of computing devices comprises at least one central processing unit (CPU) and an associated memory device, said method comprising the computer implemented steps of:

receiving, by each computing device of said plurality of computing devices, a copy of a database managing software application;

receiving, by said computing system, a steady stream of data;

dividing, by the computing system, said data into a plurality of data subsets;

associating, by the computing system, each data subset of said plurality of data subsets with a different customer number associated with a different customer;

placing, by the computing system, a different data subset of said data subsets in each said associated memory device, wherein said receiving, said dividing, and said placing are performed simultaneously;

selecting a lift chart technique for generating data mining models, wherein said data mining models comprise associated data mining models applied to each of said randomly placed data subsets;

receiving simultaneously, by each of said plurality of computing devices, said data mining modeling algorithm;

running simultaneously, on each of said plurality of computing devices, said data mining modeling algorithm on a different associated data subset of said plurality of data subsets using said selected lift chart technique to generate an associated data mining model on each of said plurality of computing devices;

calculating, by said computing system, a lift for each of said data mining models, wherein said calculating comprises calculating a first lift for first data mining model of said data mining models by dividing a percentage of expected responses predicted by said first data mining model by a percentage of expected responses predicted by a random selection, wherein a normal density of responses to a direct mail campaign for a service offer is equal to 10 percent, wherein a determination generated by focusing on a top quartile of a case set predicted to respond to said direct mail campaign by said first data mining model, wherein said determination comprises a density of responses increasing to 30 percent, and wherein said first lift is equal to 30/10;

simultaneously comparing, by a coordinator node of said computing system, each said lift to each other;

determining based on results of said comparing, by said computing system, a best data mining model from said data mining models, wherein said best data mining model is said first data mining model;

removing each said different data subset from each said associated memory device; and deploying, by said computing system, said best data mining model with respect to said direct mail campaign.

8. The computing system of claim 7, wherein said selected technique comprises and a root mean squared technique, and wherein said method further comprises:

determining by said root mean squared technique, a rate of error for each of said generated data mining models.

9. The computing system of claim 7, wherein said data mining modeling algorithm is selected from the group consisting of a decision tree algorithm, a clustering algorithm, a radial basis function algorithm, a linear regression algorithm, an associations algorithm, and a neural network algorithm.

10. The computing system of claim 7, wherein said interface apparatus is a high speed switching apparatus.

11. The computing system of claim 7, wherein said computing devices electrically coupled through said interface apparatus is a system selected from the group consisting of a massively parallel processing system, a symmetric multiprocessing system, and a combination of a massively parallel processing system and a symmetric multiprocessing system.

12. The computing system of claim 7, wherein said computing devices electrically coupled through said interface apparatus comprises a relational database software system.

13. A process for integrating computing infrastructure, comprising integrating computer-readable code into a computing system, wherein the code in combination with the computing system comprises a computer readable medium and a plurality of computing devices electrically coupled through an interface apparatus, wherein a data mining modeling algorithm is stored on said computer readable medium, wherein each of said plurality of computing devices comprises at least one central processing unit (CPU) and an associated memory device, and wherein the code in combination with the computing system is adapted to implement a method for performing the steps of:

receiving, by each computing device of said plurality of computing devices, a copy of a database managing software application;

receiving, by said computing system, a steady stream of data;

dividing, by the computing system, said data into a plurality of data subsets;

associating, by the computing system, each data subset of said plurality of data subsets with a different customer number associated with a different customer;

placing, by the computing system, a different data subset of said data subsets in each said associated memory device, wherein said receiving, said dividing, and said placing are performed simultaneously;

selecting a lift chart technique for generating data mining models, wherein said data mining models comprise associated data mining models applied to each of said randomly placed data subsets;

receiving simultaneously, by each of said plurality of computing devices, said data mining modeling algorithm;

running simultaneously, on each of said plurality of computing devices, said data mining modeling algorithm on a different associated data subset of said plurality of data subsets using said selected lift chart technique to generate an associated data mining model on each of said plurality of computing devices;

calculating, by said computing system, a lift for each of said data mining models, wherein said calculating comprises calculating a first lift for first data mining model of said data mining models by dividing a percentage of expected responses predicted by said first data mining model by a percentage of expected responses predicted by a random selection, wherein a normal density of responses to a direct mail campaign for a service offer is equal to 10 percent, wherein a determination generated by focusing on a top quartile of a case set predicted to respond to said direct mail campaign by said first data mining model, wherein said determination comprises a density of responses increasing to 30 percent, and wherein said first lift is equal to 30/10;

simultaneously comparing, by a coordinator node of said computing system, each said lift to each other;

determining based on results of said comparing, by said computing system, a best data mining model from said data mining models, wherein said best data mining model is said first data mining model;

removing each said different data subset from each said associated memory device; and deploying, by said computing system, said best data mining model with respect to said direct mail campaign.

14. The process of claim 13, wherein said selected technique comprises and a root mean squared technique, and wherein said method further comprises:

determining by said root mean squared technique, a rate of error for each of said generated data mining models.

15. The process of claim 13, wherein said data mining modeling algorithm is selected from the group consisting of a decision tree algorithm, a clustering algorithm, a radial basis function algorithm, a linear regression algorithm, an associations algorithm, and a neural network algorithm.

16. The process of claim 13, wherein said interface apparatus is a high speed switching apparatus.

17. The process of claim 13, wherein said computing system is a system selected from the group consisting of a massively parallel processing system, a symmetric multiprocessing system, and a combination of a massively parallel processing system and a symmetric multiprocessing system.

18. The process of claim 13, wherein said computing system comprises a relational database software system.

19. A computer program product, comprising a computer usable medium having a computer readable program code embodied therein, said computer readable program code comprising an algorithm adapted to implement a data mining method within a computing system, said computing system comprising a computer readable medium and a plurality of computing devices electrically coupled through an interface apparatus, wherein a data mining modeling algorithm is stored on said computer readable medium, and wherein each of said plurality of computing devices comprises at least one central processing unit (CPU) and an associated memory device, said method comprising the steps of:

receiving, by each computing device of said plurality of computing devices, a copy of a database managing software application;

receiving, by said computing system, a steady stream of data;

dividing, by the computing system, said data into a plurality of data subsets;

associating, by the computing system, each data subset of said plurality of data subsets with a different customer number associated with a different customer;

placing, by the computing system, a different data subset of said data subsets in each said associated memory device, wherein said receiving, said dividing, and said placing are performed simultaneously;

selecting a lift chart technique for generating data mining models, wherein said data mining models comprise associated data mining models applied to each of said randomly placed data subsets;

receiving simultaneously, by each of said plurality of computing devices, said data mining modeling algorithm;

running simultaneously, on each of said plurality of computing devices, said data mining modeling algorithm on a different associated data subset of said plurality of data subsets using said selected lift chart technique to generate an associated data mining model on each of said plurality of computing devices;

calculating, by said computing system, a lift for each of said data mining models, wherein said calculating comprises calculating a first lift for first data mining model of said data mining models by dividing a percentage of expected responses predicted by said first data mining model by a percentage of expected responses predicted by a random selection, wherein a normal density of responses to a direct mail campaign for a service offer is equal to 10 percent, wherein a determination generated by focusing on a top quartile of a case set predicted to respond to said direct mail campaign by said first data mining model, wherein said determination comprises a density of responses increasing to 30 percent. and wherein said first lift is equal to 30/10;

simultaneously comparing, by a coordinator node of said computing system, each said lift to each other;

determining based on results of said comparing, by said computing system, a best data mining model from said data mining models, wherein said best data mining model is said first data mining model;

removing each said different data subset from each said associated memory device; and deploying, by said computing system, said best data mining model with respect to said direct mail campaign.

20. The computer program product of claim 19, wherein said selected technique comprises and a root mean squared technique, and wherein said method further comprises:

determining by said root mean squared technique, a rate of error for each of said generated data mining models.

21. The computer program product of claim 19, wherein said data mining modeling algorithm is selected from the group consisting of a decision tree algorithm, a clustering algorithm, a radial basis function algorithm, a linear regression algorithm, an associations algorithm, and a neural network algorithm.

22. The computer program product of claim 19, wherein said interface apparatus is a high speed switching apparatus.

23. The computer program product of claim 19, wherein said computing system is a system selected from the group consisting of a massively parallel processing system, a symmetric multiprocessing system, and a combination of a massively parallel processing system and a symmetric multiprocessing system.

24. The computer program product of claim 19, wherein said computing system comprises a relational database software system.

25. The data mining method of claim 1, wherein said computing system further comprises a coordinator node, wherein said coordinator node comprises said computer readable medium, and wherein said coordinator node transmits simultaneously, to each of said computing devices, said data mining modeling algorithm.

26. The data mining method of claim 1, wherein an output of each of said data mining models comprises a numerical description representing an expected behavior for customers.

27. The data mining method of claim 1, further comprising:
receiving, by said computing system, test data, wherein said test data comprises a known outcome; and
comparing each of said data mining models on each of said computing devices to said test data to determine a best data model of said data mining models, wherein said best data model comprises a most predictive data model having a highest degree of correlation to an offer with respect to a customer of said customers as compared to all other data models of said data mining models.

* * * * *